United States Patent
Mizutani

[19]

[11] Patent Number: 5,774,146
[45] Date of Patent: Jun. 30, 1998

[54] COLOR PRINT OUTPUT APPARATUS ADAPTIVE TO PAPER TYPES

[75] Inventor: Norio Mizutani, Aichi-ken, Japan

[73] Assignee: Brother Kogyo Kabushiki Kaisha, Nagoya, Japan

[21] Appl. No.: 705,803

[22] Filed: Aug. 30, 1996

[30] Foreign Application Priority Data

Sep. 1, 1995 [JP] Japan .................................. 7-224967

[51] Int. Cl.$^6$ ...................................................... B41J 2/21
[52] U.S. Cl. .............................. 347/43; 347/15; 347/12; 358/502
[58] Field of Search ................................. 347/16, 5, 141, 347/105, 101, 43, 15, 12; 395/12, 109; 358/358, 502, 518, 505, 520, 534

[56] References Cited

U.S. PATENT DOCUMENTS 4,500,919  2/1985  Schreiber .
4,617,580  10/1986  Miyakawa .................................. 347/14

FOREIGN PATENT DOCUMENTS 359226560  12/1984  Japan ........................................ 347/14
B2-8-23661  3/1996  Japan .

Primary Examiner—N. Le
Assistant Examiner—Juanita Stephens
Attorney, Agent, or Firm—Oliff & Berridge, PLC

[57] ABSTRACT

The paper kind sensor 18 discriminates a kind of a paper to be printed by the print section 20. Receiving the paper kind information from the sensor 18, the CPU 10 selects a color-conversion table Ti out of the plurality of color-conversion tables stored in the ROM 8. The selected color-conversion table Ti corresponds to the kind of the presently-used paper. The CPU 10 then performs a color-conversion operation on print data with using the selected color-conversion table Ti. Thus color-converted print data is used in printing operation. A user will not need to consider a kind of paper to be printed, and therefore will not need to control the host computer to correct for print information before supplying the print information to the printer. It becomes possible to reduce a burden loaded on the user.

19 Claims, 9 Drawing Sheets

$$\begin{pmatrix} C' \\ M' \\ Y' \\ K' \end{pmatrix} = Ti \begin{pmatrix} C \\ M \\ Y \\ K \end{pmatrix}$$

WHERE $\quad Ti = \begin{pmatrix} C11 & C12 & C13 & C14 \\ C21 & C22 & C23 & C24 \\ C31 & C32 & C33 & C34 \\ C41 & C42 & C43 & C44 \end{pmatrix}_i$

COLOR PRINT OUTPUT APPARATUS ADAPTIVE TO PAPER TYPES

BACKGROUND OF THE INVENTION

1. Field of the Invention

The present invention relates to a print output apparatus, such as a color printer and a color copying machine, and more particularly to a print output apparatus for performing a color printing operation in accordance with print instruction inputted from an external device such as a host computer.

2. Description of the Related Art

There has been conventionally proposed a print output apparatus for performing printing operation in accordance with information received at an external interface. The information is supplied from an external information processing apparatus such as a personal computer and a work station (which will be referred to as a "host computer" hereinafter.)

The print output apparatus is, for example, of a color ink jet type. The print output apparatus therefore has an ink jet head for ejecting coloring agents of cyan, magenta, yellow, and black colors. The print output apparatus receives, from the host computer, image information and/or character information indicative of operational data for printing output colors desired to be printed. The print output apparatus prints color characters and/or color images in accordance with the received information.

SUMMARY OF THE INVENTION

Figure 1:
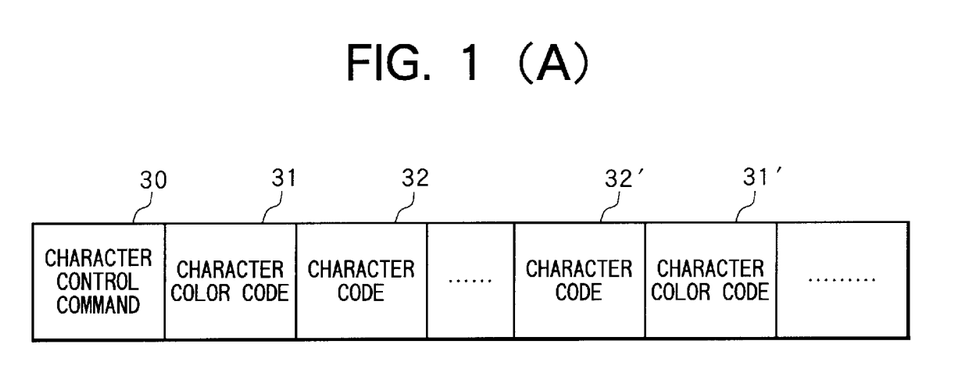
FIG. 1(A) shows one example of a conceivable character information supplied to a printer from an external information processing device.
FIG. 1(B) shows one example of a conceivable image information supplied to a printer from an external information processing device.

FIG. 1(A) shows one conceivable example of the character information transmitted from the host computer. The character information is constructed from a successive series of data A character control command 30 is supplied first in the successive series of data. The character control command 30 includes command data indicative of: transmission of the character information, and several parameters, such as shapes and positions, of characters desired to be printed. Then, several sets of character print data, that is, character color codes 31, 31', and character codes 32, 32', are supplied subsequent to the character control command 30. The character codes 32, 32' are indicative of characters desired to be printed out. The character codes 32, 32' are supplied in an order in which the corresponding characters are desired to be printed out. The character color codes 31 and 31' are indicative of colors with which the character codes transmitted after the color codes are desired to be printed. For example, the character color code 31 is indicative of a color with which the character codes 32, . . . , and 32', which are transmitted after the color code 31 and before the color code 31', are desired to be printed.

FIG. 1(B) shows one conceivable example of the image information transmitted from the host computer. The image information is constructed from a successive series of data. An image control command 40 is supplied first in the successive series of data. The image control command 40 includes command data indicative of: transmission of the image information, and several parameters, such as a position, a length, and a width of an image desired to be printed out. Then, successive series of print data (pixel color data) 41. 41', . . . are supplied subsequent to the image control command 40. The successive series of pixel color data 41, 41', . . . are indicative of information of respective pixels constituting the image.

The color printer prints out the designated color characters and/or color images based on the above-described print instruction supplied from the host computer. In other words, the color printer selectively provides the designated color ink on a print paper.

It is noted, however, that the degree to which ink spreads evenly on the print paper and the degree to which ink permeates evenly through the print paper are dependent on a kind of the print paper. Accordingly, a color actually appearing on the print paper will become somewhat different from a color designated by the print instruction.

There are several kinds of print papers: a plain paper, a high-grade paper, an OHP (overhead projector) sheet, a specially-coated paper, and so on. On the specially-coated paper, ink is hard to collapse and therefore spreads highly evenly. In order to reproduce a desired color, therefore, it is necessary to supply a smaller amount of ink to the specially-coated paper than to the plain paper. In other words, when printing on a specially-coated paper, the print instruction should preferably be corrected to designate a lighter color.

As apparent from the above, in order to obtain a high contrast print output, a user has to consider which of the several papers the user will use. Then, the user has to perform a color correction operation onto the print information to be transmitted to the color printer. This operation, however, loads a large burden on the user.

It is therefore, an object of the present invention to overcome the above-described drawbacks, and to provide an improved print output apparatus which can produce a print output of a high contrast and of a high color reproducibility onto any kind of print papers but still which does not load a large burden on a user.

In order to attain the above object and other various objects, the present invention provides a print output device for outputting a desired print, the device comprising: instruction reception means for receiving print instruction supplied from an external device; data production means for producing print data based on the received print instruction: print paper kind discrimination means for discriminating a kind of paper desired to be printed: color-conversion means for performing a color-conversion on the print data, the color-conversion being dependent on the discriminated kind of paper: and print means for obtaining a print output with the color-converted print data. The color-conversion means preferably includes: table storage means for storing a plurality of color-conversion tables each defining a color-conversion suitable to a corresponding kind of paper: table selection means for selecting one color-conversion table corresponding to the discriminated kind of paper, the table selecting means performing, on the print data, a color-conversion defined by the selected color-conversion table.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

A print output apparatus according to the present invention will be described while referring to the accompanying drawings.

Figure 2:
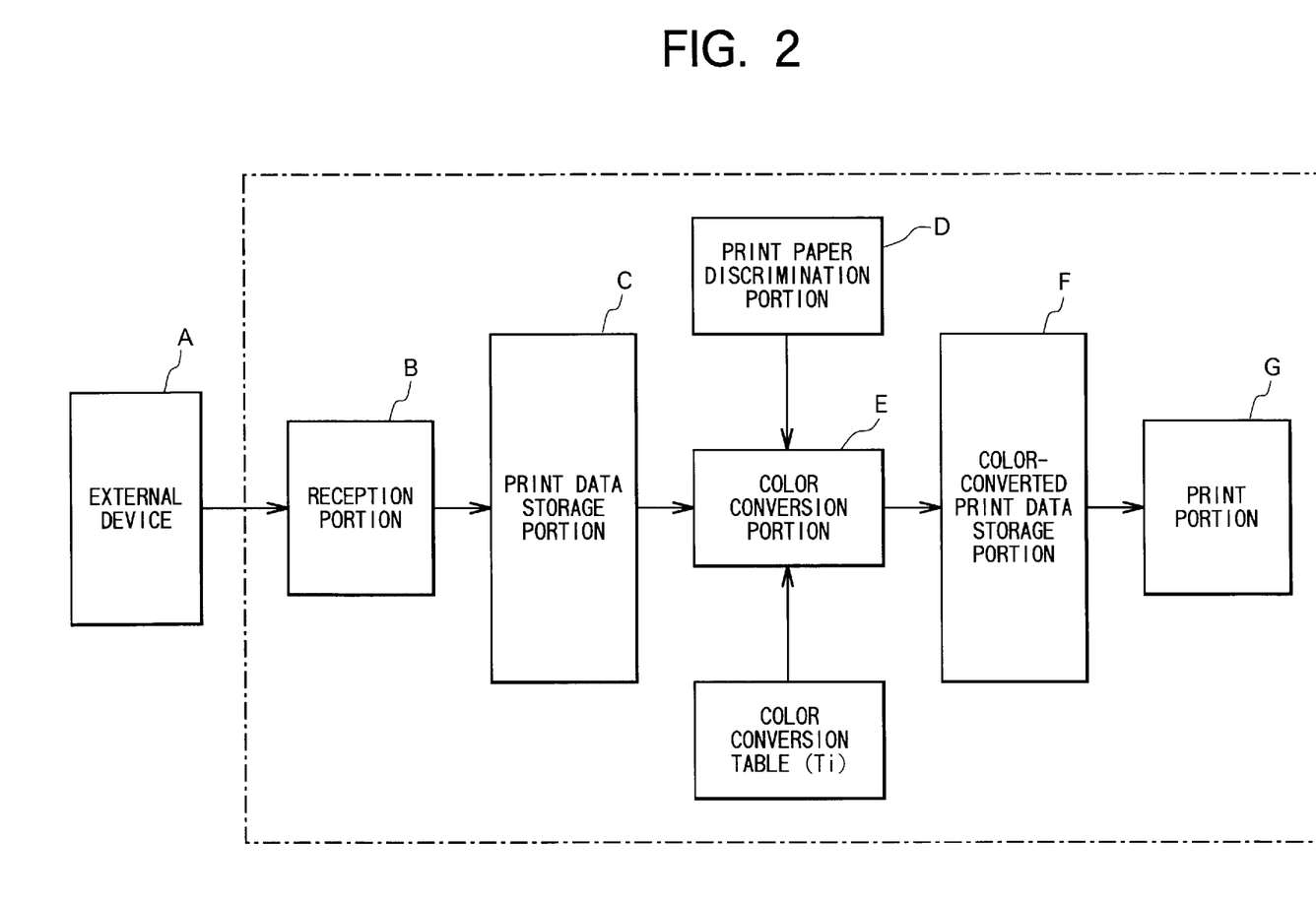
FIG. 2 is a block diagram showing a schematic structure of a print output device of the present invention.

FIG. 2 shows a schematic structure of the print output apparatus of the present invention. The print output apparatus includes a reception portion 3 for receiving print instruction supplied from an external device A. In the print output apparatus, print data is produced in accordance with the supplied print instruction A print data storage portion C is provided for temporarily storing the produced print data. According to the present invention, a print paper discrimination portion D is provided for discriminating a kind of a print paper desired to be printed. A color conversion portion E performs color-conversion onto the print data stored in the storage portion C. The color-conversion corresponds to the discriminated print paper kind. The color-converted print data is temporarily stored in a color-converted print data storage portion F before being supplied to a print portion G. The print portion G performs a printing operation with the color-converted print data.

With the above-described structure, the supplied print data is properly color-converted in correspondence with the kind of the print paper. The apparatus can therefore print characters and/or images of high contrast and of high reproducibility regardless of the kind of the print paper.

The color conversion portion B may preferably be provided with a plurality of conversion tables Ti in correspondence with a plurality of kinds of print papers. Each table Ti is for performing a color-conversion suitable for a corresponding kind of print paper. The color conversion portion 9 merely selects or switches one of the plurality of conversion tables Ti in accordance with the determined kind of the print paper to be printed, and performs a color-conversion operation suitable to the print paper.

In order to discriminate a paper kind, it is conceivable to: detect a paper discrimination mark which is previously printed on a paper, measure a light reflectance of a paper surface; measure a surface roughness of a paper: measure a color density of a paper: measure light transmittance of a paper: measure a weight of a paper: measure a thickness of a paper; measure a friction coefficient of a paper; measure a permittivity of a paper: measure a water content of a paper: or the like. It is possible to discriminate or determine a kind of a paper through performing one of the above-described operations or through performing two or more of the above-listed operations in combination.

A print output apparatus according to a preferred embodiment of the present invention will be described below with reference to FIGS. 3 through 9 wherein like parts and components are designated by the same reference numerals.

This embodiment is a color ink jet printer 100 to which the present invention is applied.

Figure 3:
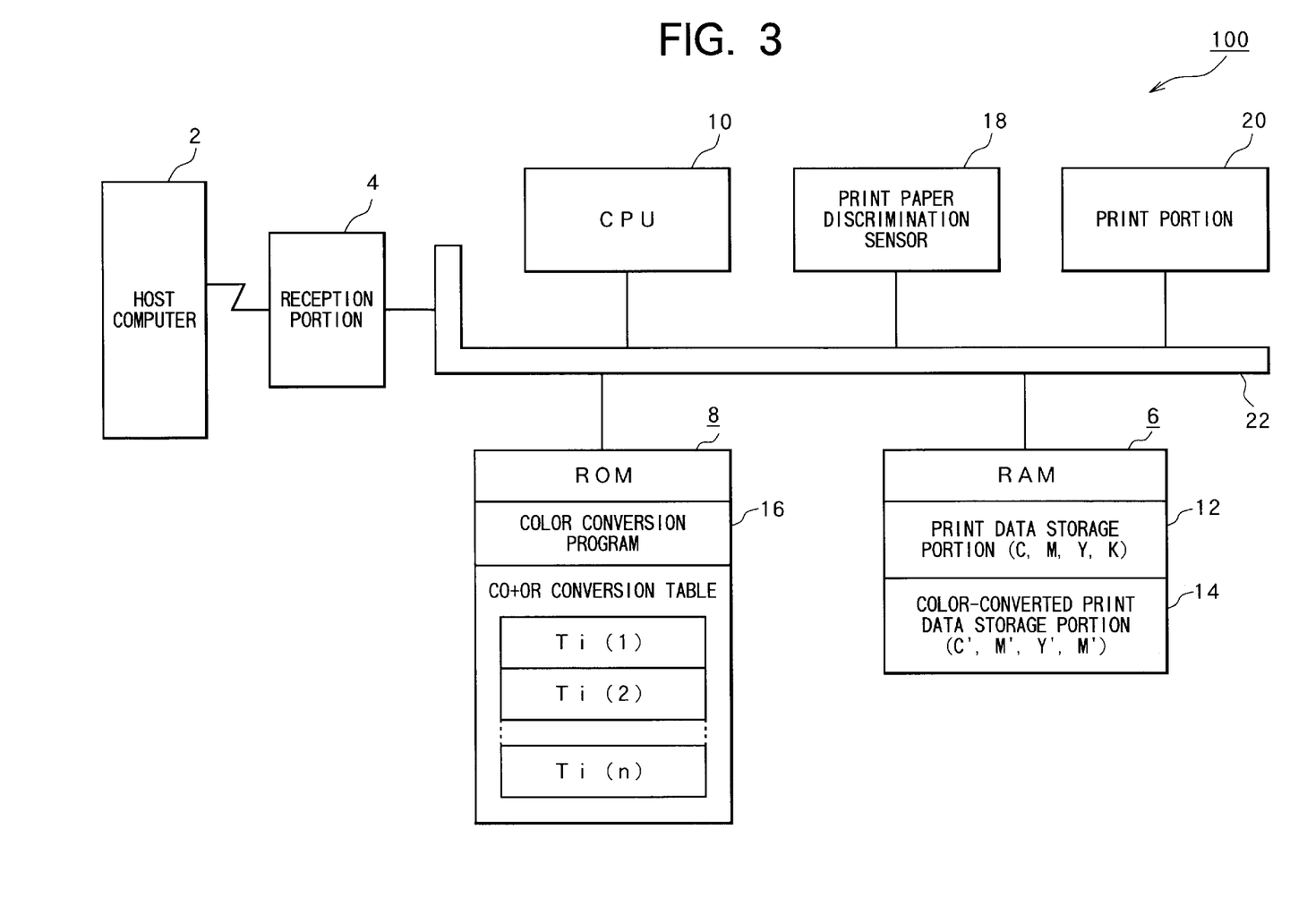
FIG. 3 is a block diagram showing a schematic structure of a printer according to a preferred embodiment of the present invention.

As shown in FIG. 3, the color ink jet printer 100 of the present embodiment includes: a reception portion 4; a random access memory (RAM) 6: a read-only memory (ROM) 8; a central processing unit (CPU) 10; a print portion 20: and a print paper discrimination sensor 18 which are connected with one another via a data bus line 22.

The reception portion 4 is constructed from an external interface for receiving print instruction supplied from an external host computer 2 such as a personal computer and a work station. The print instruction includes character information as shown in FIG. 1(A) and/or image information as shown in FIG. 1(B). Each of the character information and the image information includes both control codes and print data as shown in FIGS. 1(A) and 1(B).

Figure 6:
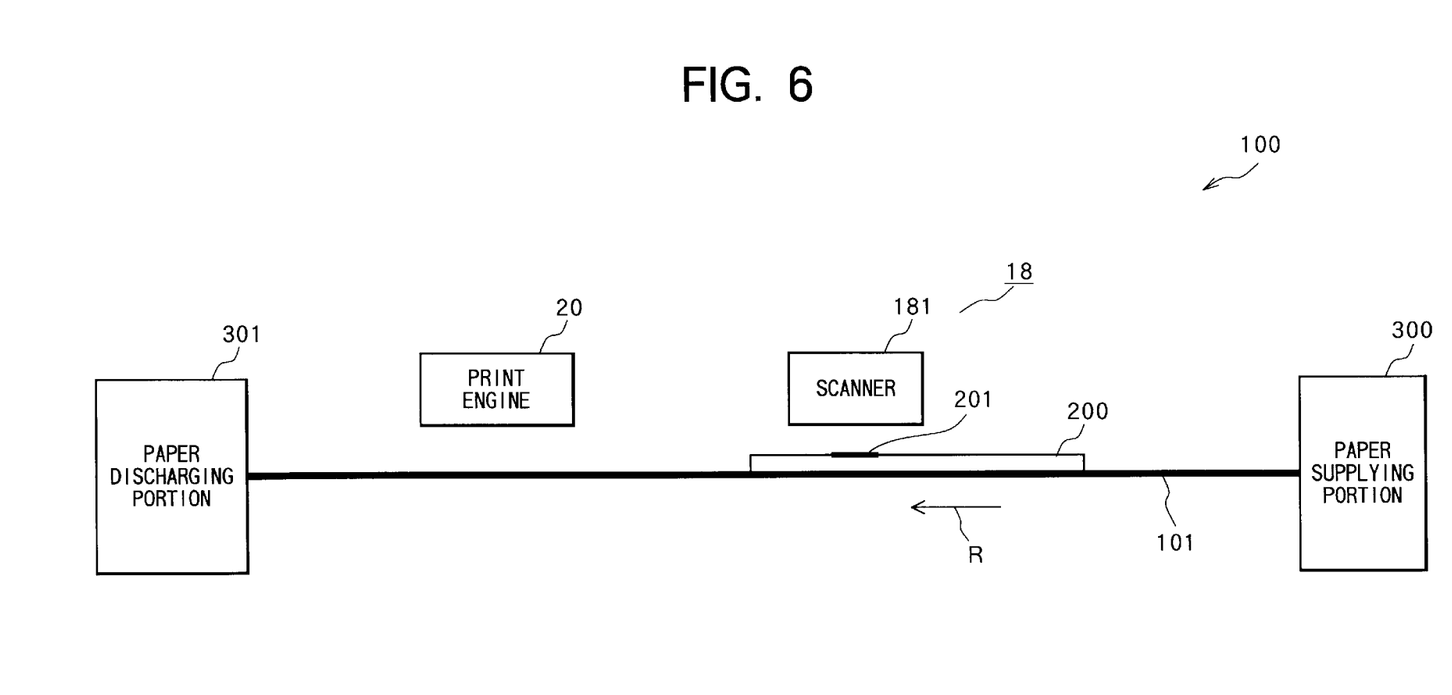
FIG. 6 schematically shows one example of a print paper discrimination sensor 18 shown in FIG. 3.

The print portion 20 is constructed from a color ink jet type print engine (print head). As shown in FIG. 6. the ink jet print engine 20 is disposed above a paper transport path 101 provided inside the color ink jet printer 100. In this example, the print head 20 is designed to print cyan, magenta, yellow, and black color inks onto a print paper 200 which is being transported along the print transport path 101.

Although not shown in the drawing, several sheet feed rollers are arranged along the paper transport path 101 for conveying the print paper 200 along the transport path 101 in a sheet feeding direction Indicated by an arrow R in the figure. The print paper 200 is conveyed along the transport path 101 in the sheet feeding direction R from a paper supplying portion 300 to a paper discharging portion 301. The paper supplying portion 300 is constructed from an inlet for receiving a sheet of paper 200. Or, the paper supplying portion 300 may be constructed from a sheet cassette storing a plurality of sheets of papers 200. The sheets of papers 200 are supplied one by one from the sheet cassette 300 to the sheet transport path 101. The paper discharging portion 301 is constructed from an outlet for discharging a printed paper 200 out of the printer 100 onto a discharge tray. Although not shown in the drawing, an image fixing portion is disposed on the sheet transport path 101 between the print head 20 and the paper discharging portion 301 for fixing the color ink onto the paper 200.

The ink jet printer 100 of the present embodiment is capable of printing images and characters on a plurality of kinds of papers: a plain paper, a high-grade paper, an OHP sheet, a specially-coated paper, and so on. In other words, the paper supplying portion 300 is designed so as to be capable of supplying the plurality of kinds of papers 200 to the sheet transport path 101.

The print paper discrimination sensor 18 is disposed in the upstream side of the print head 20 in the sheet feeding direction. The print paper discrimination sensor 18 is for discriminating a kind of a print paper 200 which is presently being transported along the transport path 101 and therefore which is to be printed by the print engine 20.

In this example, each print paper 200 is originally printed with a discrimination mark 201. The discrimination mark 201 is provided at a position outside a printable range of the print paper 200 into which the print engine 20 will print images and/or characters. The discrimination mark 201 indicates a kind of the paper 200. In other words, the discrimination marks 201 printed on the respective kinds of papers 200 are different from one another.

The discrimination sensor 18 is constructed from a scanner 181. The scanner 181 is designed to detect the discrimination mark 201 on the paper 200 which is being transported along the transport path 101. In this example, the discrimination mark 201 is an optically-sensible mark, and the scanner 181 is constructed from a photosensor or the like so as to be capable of optically detecting the discrimination mark 201. When detecting the discrimination mark 201, the scanner 181 produces a detection signal indicative of the discrimination mark 201.

The ROM 8 stores therein various control programs such as a color conversion program 16.

The ROM 8 further stores therein a plurality of color-conversion tables Ti(1)–Ti(n) in correspondence with the plurality of kinds of papers 200 printable by the present printer 100. Each table Ti ($1 \leq i \leq n$) is indicative of a color-conversion suitable for a corresponding kind of paper 200. Each table Ti is in the form of a matrix shown in FIG. 5 for converting print data (C, M. Y, K) into color-converted print data (C', M', Y', a') through a masking method.

Figure 5:
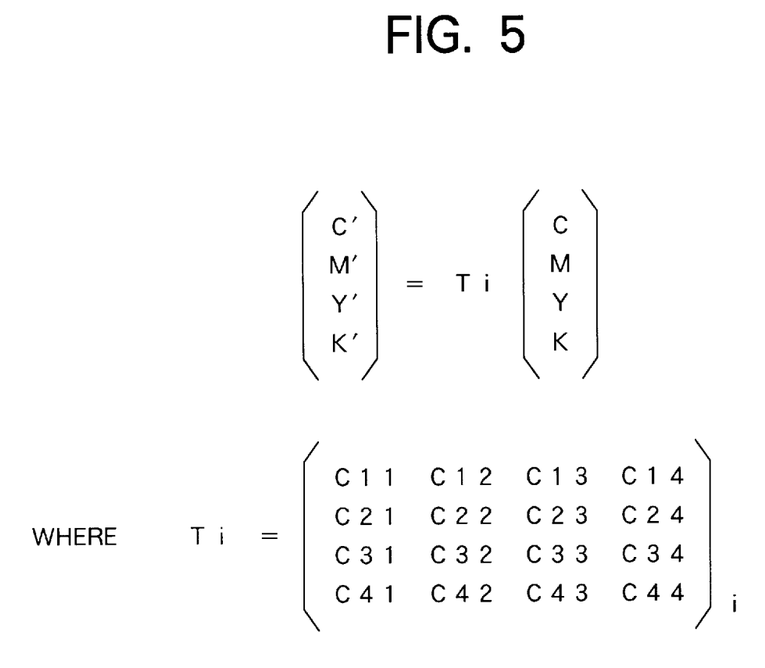
FIG. 5 shows an equation indicative of a color-conversion operation for converting print data (C, M, Y, K) into color-converted print data (C', M', Y', K')

The coefficients C11, C12, . . . , and C44 in each matrix Ti are determined dependent on the corresponding kind of paper. That is, the coefficients C11, C12, . . . , and C44 have values that will properly convert the values (C, M, Y, K) into values (C', M', Y', K') which can produce a high contrast image on the corresponding kind of paper.

It is noted that the coefficient values C11, C12, and C44 are determined dependent on examination results. That is, examinations are previously performed for all the plurality of kinds of papers 200. During an examination for each kind of paper, the print engine 20 is controlled by several sets of color-converted print data (C', M', Y', K') to produce several ink colors on the paper. The ink colors appearing on the paper are evaluated. Based on the evaluated results, the coefficient values C11, C12, . . . , and C44 are determined dependent on the used color-converted print data.

Although not shown in the drawing, the ROM 8 further stores therein data indicative of the plurality of kinds of papers 200. In this example, the ROM 8 stores therein data indicative of the discrimination marks 201 printed on the plurality of kinds of papers 200.

The CPU 10 is for performing various operations in accordance with the control programs stored in the ROM 8. For example, the CPU 10 performs a color conversion process shown in FIG. 4 according to the color conversion program 16. During the color conversion process, the CPU 10 produces print data in accordance with the print instruction received at the reception portion 4. In this example, the CPU 10 produces print data (C, M. Y, K) representative of cyan, magenta, yellow, and black color components from the received instruction.

Upon receiving the detection signal from the scanner 181, the CPU 10 compares the mark 201 indicated by the received detection signal with the plurality of detection marks stored in the ROM 8. In more concrete terms, the CPU 10 performs a pattern matching operation to judge which of the stored plural marks matches with the detected mark. Based on the matching operation result, the CPU 10 determines a kind of the paper 200 now transported along the transport path 101.

The CPU 10 then selects one color-conversion table Ti which corresponds to the detected paper kind. The CPU 10 then performs the color-conversion operation shown in FIG. 5 with the use of the selected color-conversion Table Ti. The CPU 10 converts the print data (C. M. Y. K) into color-converted print data (C', M', Y', K'). The CPU 10 thus attains a color-conversion operation suitable for the paper 200 to be printed.

The RAM 6 is formed with: buffer memory areas for temporarily storing data: and working registers for being used by the CPU 10 to perform the above-described various operations. For example, the RAM 6 has a print data storage portion 12 for storing the print data (C, M, Y. K) produced by the CPU 10 based on the supplied print instruction. The RAM 6 also has a color-converted print data storage portion 14 for storing the color-converted print data (C', M', Y', K') obtained through the color-conversion operation.

With the above-described structure, the color ink jet printer 100 performs the following processes.

Figure 4:
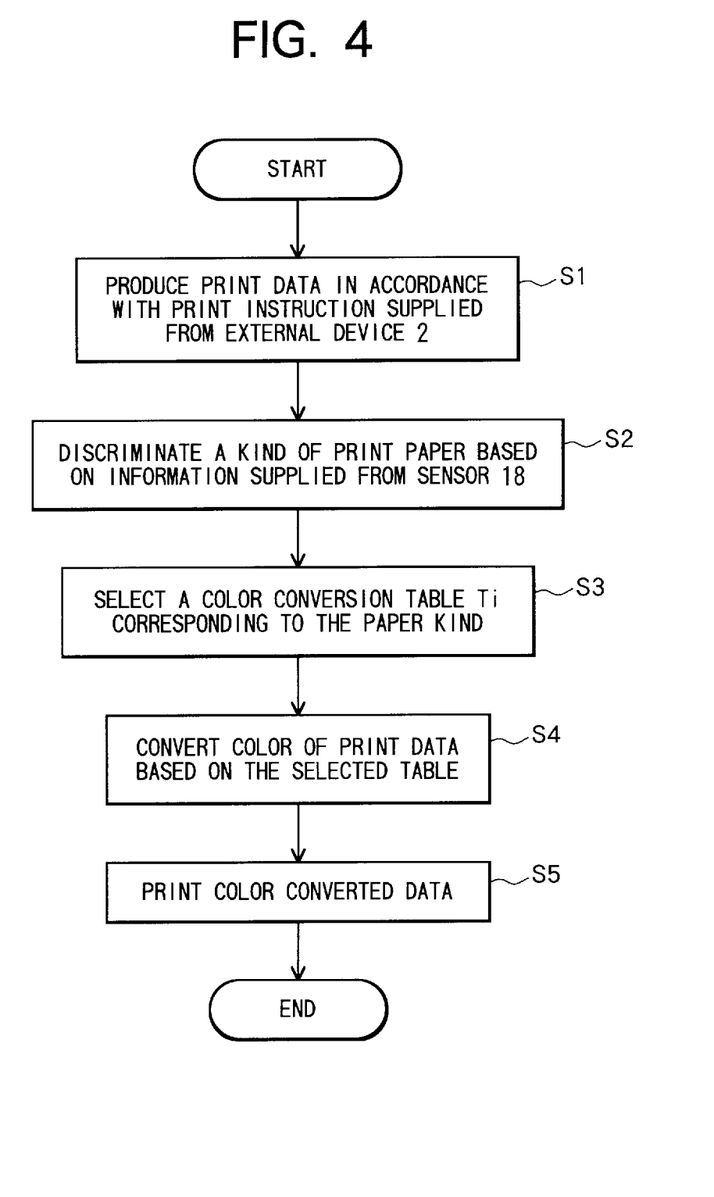
FIG. 4 is a flow chart showing a process performed in the printer of FIG. 3.

As shown in FIG. 4, the CPU 10 produces in Si print data (C, M, Y, K) in accordance with the print instruction inputted through the external interface 4 from the external host computer 2. The CPU 10 then stores the print data (C, M. Y. K) in the print data storage portion 12 of the RAM 6.

One sheet of paper 200 is supplied from the paper supplying portion 300 to the sheet transport path 101. The sheet of paper 200 is conveyed along the transport path 101 in the sheet feeding direction R. When the paper 200 reaches the position below the scanner 181, the scanner 181 detects the mark 201 on the paper 200 and outputs a detection signal.

Then, in S2, the CPU 10 receives the detection signal from the scanner 181 (sensor 16). The detection signal is indicative of the mark 201 printed on the print paper 200 which is now transported along the transport path 101 toward the print engine 20. Based on the supplied information, the CPU 10 determines a kind of the print paper 200. That is, the CPU 10 performs a pattern matching operation on the detected mark and the plurality of marks stored in the ROM 8. Based on the matching result, the CPU 10 determines a kinds of the paper 200 now being supplied to the print engine 20.

Next, in S3, the CPU 10 retrieves from the ROM 8 a color-conversion table Ti that corresponds to the determined paper kind. In S4, the CPU 10 performs a color-conversion operation on the print data (C, M, Y, X) which is now stored in the storage portion 12. The CPU 10 performs the color-conversion calculation as shown in FIG. 5 with the retrieved matrix table Ti. The CPU 10 then stores an obtained set of color-converted print data (C', M', Y', K') in the color-converted print data storage portion 14.

Next, in S5, the CPU 10 further performs several image processing operations on the color-converted print data (C', M', Y', K'). These image processing operations are required for properly controlling the color ink jet print head 20. For example, when the print head 20 is designed to print one page based on one set of print data, the CPU 10 produces one page's worth of print data based on the color-converted print data. The one page's worth of print data therefore includes: the color-converted print data indicative of color portions to be produced in one page: and data indicative of non-color. i.e., white portions to be produced in that page. When the print head 20 is designed to print several sections of one page from several sets of print data, the CPU divides the one page's worth of data Into several sets of data in correspondence with the several sections.

Then, the thus produced print data is supplied to the print engine 20. When the paper 200 reaches the position below the print engine 20, the print engine 20 is controlled by the print data to eject inks of cyan, magenta, yellow, and black colors. Color images and/or color characters are obtained at the desired colors on the print paper 200 now transported below the print engine 20. The color images and/or color characters are then fixed onto the paper 200 by the image fixing portion (not shown). Then, the paper 200 is discharged out of the printer 100 through the paper discharging portion 301.

As described above, according to the present embodiment, the paper kind sensor 18 discriminates a kind of a paper which is being supplied to the print section 20. Receiving the paper kind information from the sensor 18, the CPU 10 selects a color-conversion table Ti out of the plurality of color-conversion tables stored in the ROM 8. The selected color-conversion table Ti corresponds to the kind of the presently-used paper. The CPU 10 then performs a color-conversion operation on print data with using the selected color-conversion table Ti. Thus color-converted print data is used in printing operation. A user will not need to consider a kind of paper to be printed, and therefore will not need to control the host computer to correct for print information before supplying the print information to the printer. It becomes possible to reduce a burden loaded on the user.

In the above description, the sensor 18 is comprised of the scanner 181 which is designed to optically detect a mark 201 printed on the print paper 200. However, the sensor 18 may be designed to detect or measure other various conditions of the print paper. In this case, it is unnecessary to previously print discrimination marks 201 on print papers 200.

Figure 7:
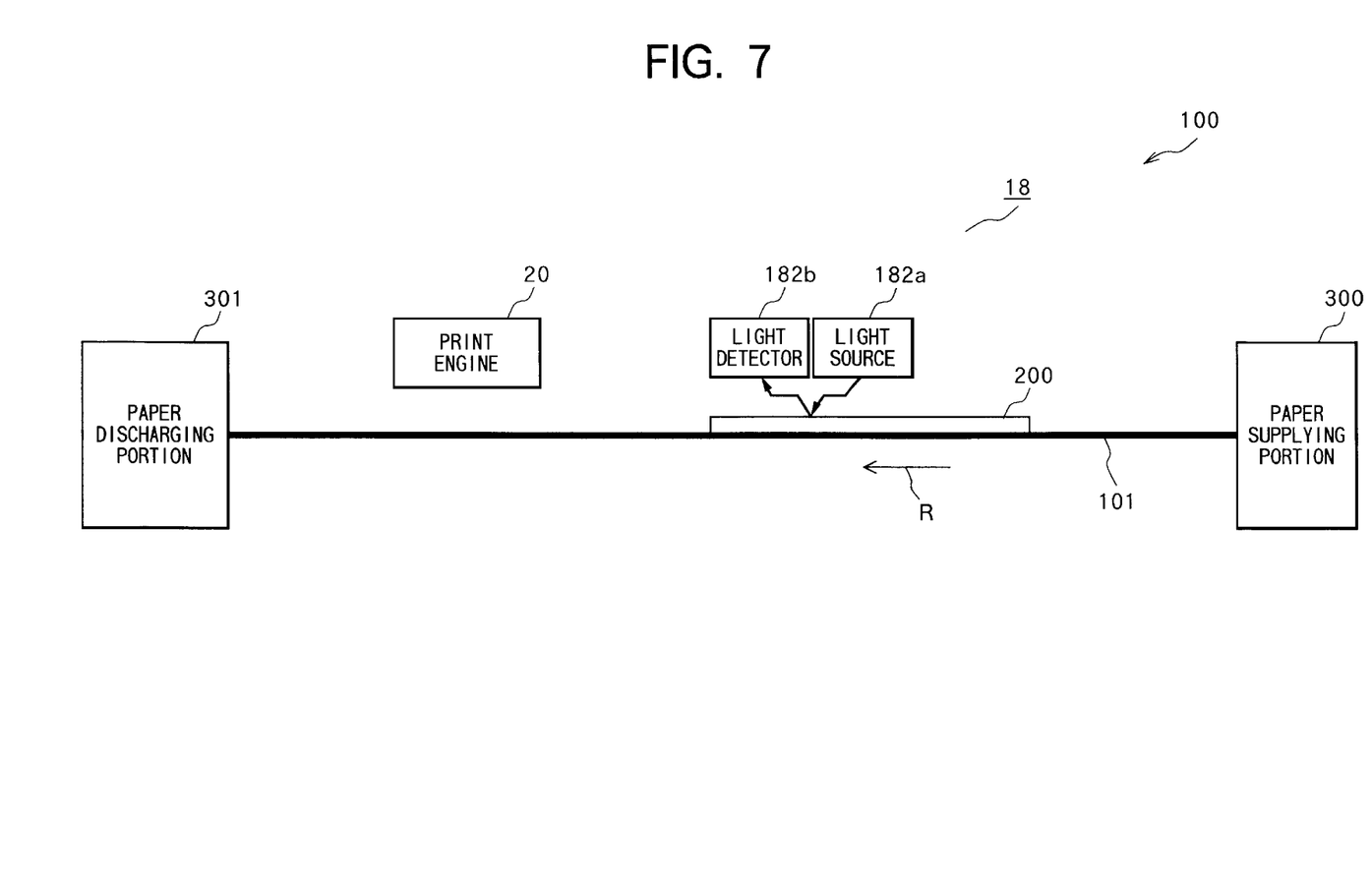
FIG. 7 schematically shows another example of the print paper discrimination sensor 18.

For example, the sensor 18 may be designed to measure a light reflectance of a surface of the print paper 200. In this case, the sensor 18 may be constructed from a light source 182a and a light detector 182b as shown in FIG. 7. Both of the elements 182a and 182b are disposed above the transport path 101. The light source 182a emits light to a surface of the print paper 200 which is being transported along the transport path 101. The light detector 182b receives light reflected from the surface of the print paper 200. The light source 182a supplies the CPU 10 with a signal indicative of the intensity of the light emitted toward the paper 200. The light detector 182b supplies the CPU 10 with a signal indicative of the intensity of the light reflected from the paper 200. Receiving those signals from the elements 182a and 182b, the CPU 10 calculates a light reflectance of the paper 200.

In this case, the ROM 8 previously stores therein light reflectance values of the plurality of kinds of papers. By comparing the calculated light reflectance with the plurality of values, the CPU 10 determines a kind of the paper 200 now transported along the transport path 101.

With the above-described structure, the elements 182a and 182b can supply the CPU 10 with information also on color density of the paper 200. That is, the CPU 10 may calculate a color density of the paper 200 based on the signals supplied from the elements 182a and 182b. The ROM 8 previously stores therein color density values of the plurality of kinds of papers. By comparing the calculated color density with the plurality of values, the CPU 10 determines a kind of the presently-transported paper 200.

Figure 8:
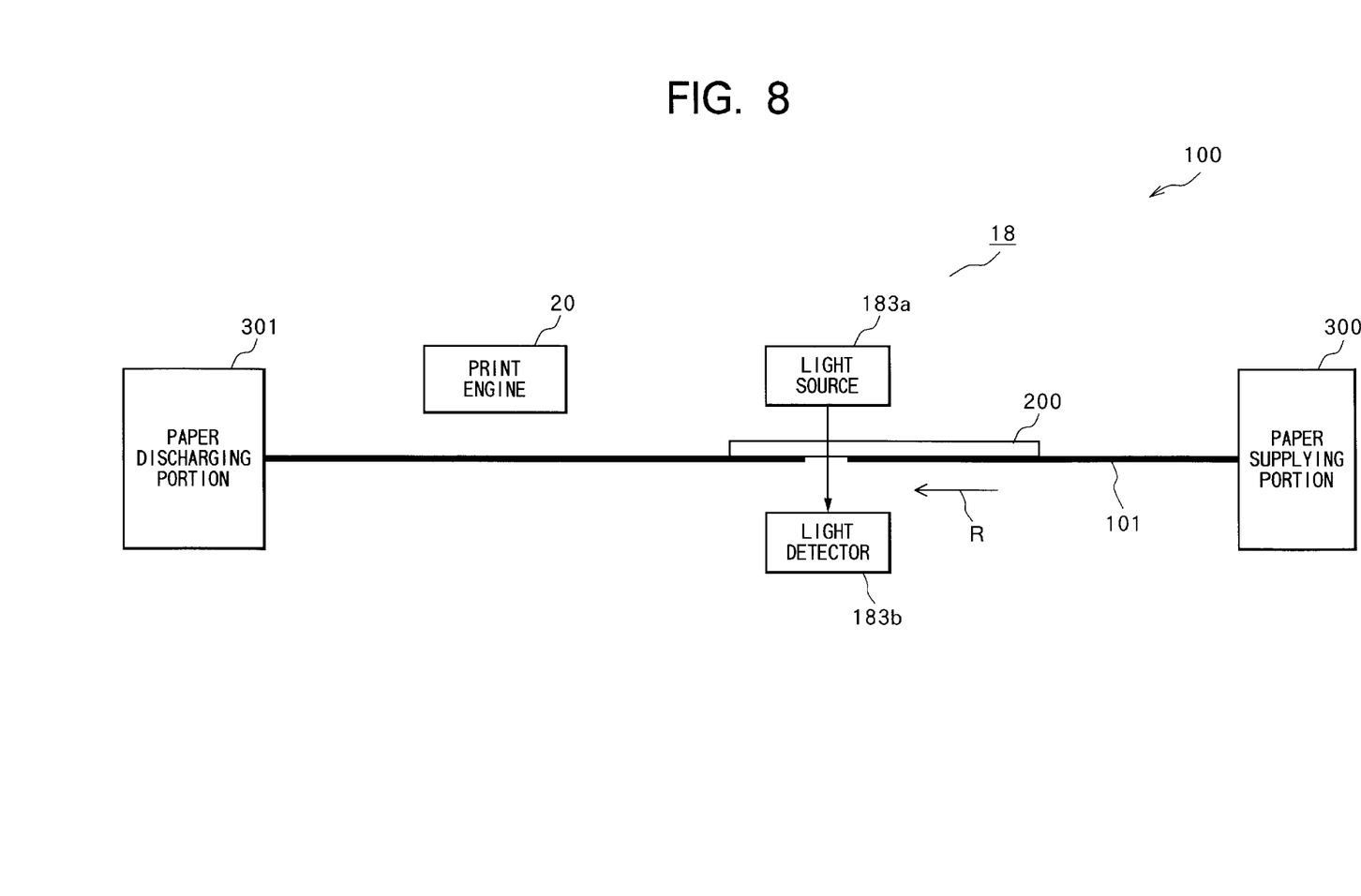
FIG. 8 schematically shows still another example of the print paper discrimination sensor 18.

FIG. 8 shows another example of the sensor 18 which is designed to measure a light transmittance of the paper 200. In this case, the sensor 18 is constructed from a light source 183a and a light detector 183b which are disposed in opposite sides of the transport path 101. The light source 183a emits light to the print paper 200 now being transported along the transport path 101. The light detector 183b receives light passing through the print paper 200. The light source 183a supplies the CPU 10 with a signal indicative of the intensity of the light emitted toward the paper 200. The light detector 183b supplies the CPU 10 with a signal indicative of the intensity of the light passing through the paper 200. Receiving those signals from the elements 183a and 183b, the CPU 10 calculates a light transmittance of the paper 200.

The ROM a previously stores therein light transmittance values of the plurality of kinds of papers. By comparing the calculated light transmittance with the plurality of values, the CPU 10 determines a kind of the paper 200 now transported along the transport path 101.

Figure 9:
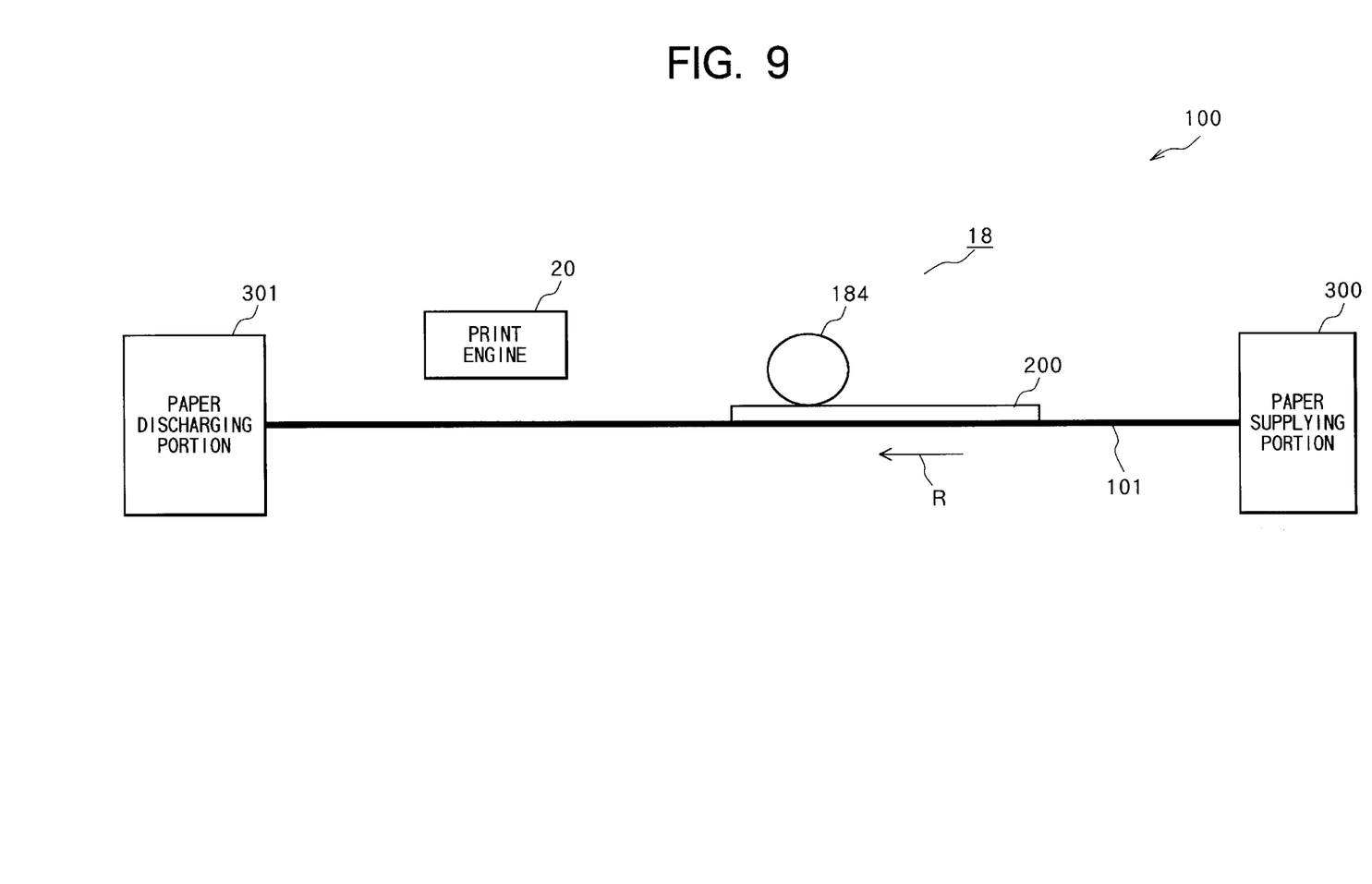
FIG. 9 schematically shows a further example of the print paper discrimination sensor 18.

FIG. 9 shows still another example of the sensor 18 which is designed to measure a friction coefficient of the paper 200. In this case, the sensor 18 is constructed from a friction resistance detection roller 184 disposed above the transport path 101. The friction resistance detection roller 184 is for contacting the paper 200 transported along the transport path 101 and for measuring a friction resistance occurring between the roller 184 and the paper 200. The element 184 supplies the CPU 10 with a signal indicative of the friction resistance. Receiving the signal, the CPU 10 calculates a friction coefficient of the paper 200.

In this case, the ROM 8 previously stores therein friction coefficient values of the plurality of kinds of papers. By comparing the calculated friction coefficient with the plurality of values, the CPU 10 determines a kind of the paper 200 now transported along the transport path 101.

The sensor 18 may be designed to measure other various parameters of the paper 200. For example, the sensor 18 may be designed to measure a surface roughness of a print paper. The sensor 18 may further be designed to measure a weight, a thickness, a permittivity, a water content, or the like of the print paper 200. The ROM 8 may be stored with various parameters of the plurality of kinds of papers. The CPU 10 can determine a kind of the presently-transported paper 200 by comparing the sensor-detected result with the stored plurality of values.

The sensor 18 may be designed to detect or measure either one of the parameters of the paper 200. Or otherwise, the sensor 18 may be designed to detect two or more of the parameters in combination. This will provide a more reliable paper kind judgement. For example, the pair of elements 182a and 182b of FIG. 7 and the element 184 of FIG. 9 may be arranged along the sheet transport path 101 to measure both the light reflectance and the friction coefficient of the sheet of paper 200.

As described above, the print output device of the present invention discriminates a kind of a print paper to be printed. The print output device performs color-conversion processes dependent on the kind of the print paper, thereby obtaining a print output with a high reproducibility. It is possible to obtain a print output of a high contrast onto any kinds of print paper, such as a plain paper, a high-grade paper, an OHP sheet, a specially-coated paper, and the like. The user does not need to correct for print instruction before supplying the print instruction to the printer. It is possible to reduce burden loaded on the user.

The print output device stores therein the plurality of color-conversion tables. Accordingly, the device can perform a color-conversion operation suitable for any kind of paper through merely selecting a color-conversion table corresponding to the paper being used.

While the invention has been described in detail with reference to the specific embodiment thereof, it would be apparent to those skilled in the art that various changes and modifications may be made therein without departing from the spirit of the invention.

What is claimed is:

1. A print output device for outputting a desired print output, the device comprising:

instruction reception means for receiving print instruction supplied from an external device;

data production means for producing print data based on the received print instruction;

print paper kind discrimination means for discriminating a kind of paper desired to be printed;

color-conversion means for performing a color-conversion on the print data, the color-conversion being dependent on the discriminated kind of paper, the color-conversion means including table storage means for previously storing a plurality of color-conversion tables each defining a color-conversion suited for a corresponding one of a plurality of kinds of paper and table selection means for selecting one color-conversion table corresponding to the discriminated kind of paper, the table selecting means performing, on the print data, a color-conversion defined by the selected color-conversion table to thereby produce color-converted print data suited for the kind of paper desired to be printed; and print means for obtaining a print output on the desired paper with the color-converted print data.

2. A print output device as claimed in claim 1, wherein the print paper kind discrimination means includes mark detection means for detecting a mark previously printed on the desired print paper, thereby discriminating the kind of the paper.

3. A print output device as claimed in claim 1, wherein the print paper kind discrimination means includes light reflectance detection means for detecting a light reflectance of the desired print paper, thereby discriminating the kind of the paper.

4. A print output device as claimed in claim 1, wherein the print paper kind discrimination means includes surface roughness detection means for detecting a surface roughness of the desired print paper, thereby discriminating the kind of the paper.

5. A print output device as claimed in claim 1, wherein the print paper kind discrimination means includes color density detection means for detecting a color density of the desired print paper, thereby discriminating the kind of the paper.

6. A print output device as claimed in claim 1, wherein the print paper Rind discrimination means includes light transmittance detection means for detecting a light transmittance of the desired print paper, thereby discriminating the kind of the paper.

7. A print output device as claimed in claim 1, wherein the print paper kind discrimination means includes weight detection means for detecting a weight of the desired print paper, thereby discriminating the kind of the paper.

8. A print output device as claimed in claim 1, wherein the print paper kind discrimination means includes thickness detection means for detecting a thickness of the desired print paper, thereby discriminating the kind of the paper.

9. A print output device as claimed in claim 1, wherein the print paper kind discrimination means includes friction coefficient detection means for detecting a friction coefficient of the desired print paper, thereby discriminating the kind of the paper.

10. A print output device as claimed in claim 1, wherein the print paper kind discrimination means includes permittivity detection means for detecting a permittivity of the desired print paper, thereby discriminating the kind of the paper.

11. A print output device as claimed in claim 1, wherein the print paper kind discrimination means includes water content detection means for detecting a water content of the desired print paper, thereby discriminating the kind of the paper.

12. A print output device as claimed in claim 1, wherein each of the plurality of color-conversion tables is a matrix whose coefficients are determined dependent on the corresponding one of the plurality of kinds of paper, the table selecting means selecting one matrix in accordance with the discriminated kind of paper and converting the print data into the color-converted print data through a masking method using the selected matrix.

13. A print output device as claimed in claim 12, further comprising print paper receiving means for receiving the print paper desired to be printed with the print data, wherein the print paper kind discrimination means discriminates the kind of the paper received by the print paper receiving means, the color-conversion means performing the color-conversion on the print data to thereby produce the color-converted print data suited for the kind of the received paper, the print means obtaining a print output on the received paper with the color-converted print data.

14. A print output device as claimed in claim 13, wherein the print paper kind discrimination means includes:

detection means for detecting a predetermined parameter of the paper received by the print paper receiving means;

storage means for previously storing a plurality of values of the predetermined parameter for the plurality of kinds of papers; and comparison means for comparing the detected value of the predetermined parameter with the plurality of values of the predetermined parameter stored in the storage means, thereby determining the kind of the received paper, the table selecting means selecting one color-conversion table in accordance with the determined kind of paper.

15. A print output device as claimed in claim 14, wherein the detection means detects a mark previously printed on the received paper, the storage means previously storing data of a plurality of marks printed on the plurality of kinds of papers, the comparison means performing a pattern matching operation to compare the detected mark with the plurality of marks stored in the storage means, thereby determining the kind of the received paper.

16. A print output device as claimed in claim 14, wherein the detection means detects light reflectance of the received paper, the storage means previously storing a plurality of light reflectance values of the plurality of kinds of papers, the comparison means comparing the detected light reflectance value with the plurality of light reflectance values stored in the storage means, thereby determining the kind of the received paper.

17. A print output device as claimed in claim 14 wherein the detection means detects color density of the received paper, the storage means previously storing a plurality of color density values of the plurality of kinds of papers, the comparison means comparing the detected color density value with the plurality of color density values stored in the storage means, thereby determining the kind of the received paper.

18. A print output device as claimed in claim 14, wherein the detection means detects light transmittance of the received paper, the storage means previously storing a plurality of light transmittance values of the plurality of kinds of papers, the comparison means comparing the detected light transmittance value with the plurality of light transmittance values stored in the storage means, thereby determining the kind of the received paper.

19. A print output device as claimed in claim 14, wherein the detection means detects friction coefficient of the received paper, the storage means previously storing a plurality of friction coefficient values of the plurality of kinds of papers, the comparison means comparing the detected friction coefficient value with the plurality of friction coefficient values stored in the storage means, thereby determining the kind of the received paper.

* * * * *